Dec. 10, 1968 C. L. ALDEN ET AL 3,415,407

CONTAINER

Filed March 7, 1967

INVENTORS
CHARLES L. ALDEN
DAVID F. BERKEY
BY
Carpenter, Kinney & Coulter
ATTORNEYS

United States Patent Office 3,415,407

Patented Dec. 10, 1968

3,415,407

CONTAINER

Charles L. Alden, White Bear Lake, and David F. Berkey, Columbia Heights, Minn., assignors to Minnesota Mining & Manufacturing Company, St. Paul, Minn., a corporation of Delaware Filed Mar. 7, 1967, Ser. No. 621,202
6 Claims. (Cl. 220—4)

ABSTRACT OF THE DISCLOSURE

This invention provides a durable, substantially dust-proof, inexpensive, light-weight plastic mailer for magnetic recording tape that may be used in hundreds or more mail shipments and which may be quickly and conveniently addressed at each shipment by use of a removable, nonadhesive address card.

BACKGROUND OF THE INVENTION

Small, shallow, molded plastic boxes have become popular as mailers for small reels or cartridges of magnetic recording tape, such as the small reels of magnetic recording tape on which personal correspondence is recorded and sent to a geographically distant relative or friend. In comparison with cardboard boxes, which had been previously used as mailers, molded plastic boxes withstand much better the inevitable rough mail handling. Because of their durability, plastic mailers have a longer life and they protect the enclosed reel much more adequately. In addition, dust, which may interfere with recording or reproducing, is not formed from the plastic box as it sometimes is with a cardboard box.

Typically, plastic mailers (as well as cardboard mailers) have been addressed with an address label adhered to the mailer by a layer of water-soluble or pressure-sensitive adhesive coated on one side of the label. An obvious disadvantage of this system is that a new label, at some expense and some time in addressing, is needed for each mailing of the mailer. Also, at some point during the remailings, the old labels should be removed.

While maintaining the durability and other advantages of plastic mailers, the mailer of the present invention avoids the named disadvantages, especially when the mailer is used, as it is most often used, in back-and-forth correspondence between a few persons. The new mailer can be addressed with a nonadhesive address card that is retained on the mailer by its insertion under retaining flanges. Where the correspondence is between two persons, their addresses can be on opposite sides of the card and the card reversed for each shipment. Where more than two persons are participating in the correspondence, other address cards can be stored inside the mailer.

Designing the new mailer required that certain limitations of plastic molding procedures be overcome. By past procedures, the production of thin projecting tabs in a plastic injection molded part, such as the retaining flanges of the new mailer, would be prohibitively expensive and quite difficult of accomplishment. For example, a typical procedure would involve use of very thin, sliding parts to form the recess under the tab. Such a mold would be too complicated for use for the present kind of inexpensive box, and it is unlikely that the thin, sliding parts could withstand the extremely high pressures developed during the injection molding procedure.

SUMMARY OF THE INVENTION

By this invention a mailer is provided that holds address cards under durable retaining flanges and yet is simply molded. Briefly, the new mailer includes at least one large-area sidewall having (1) a flat, central, generally rectangularly panel discontinued at edge portions of the base rectangle, (2) retaining flanges parallel to and spaced about card thickness above the panel and substantially coextensive with the discontinued portions of the base rectangle of the panel, and (3) a raised rim at at least the discontinued portions of the side wall to which the retaining flanges are joined. Preferably the panel is discontinued at the extreme corners of the base rectangle along generally diagonal lines and the retaining flanges are generally triangular in shape. Also, preferably the raised rim is formed as a continuous rectangle around the panel, and the retaining flanges are attached to the rim in the corners of the rectangle. The new mailer is desirably an integral plastic article including two mating parts which are hinged together and the mating edges of which have a telescoping substantially dust-proof fit.

It will be noted that this design leaves narrow slots in at least one sidewall of the mailer. While according to convention in the magnetic recording art such slots would never be considered permissible, it has been found that with an address card fitted into the slots the mailer is substantially dust-proof. This unconventional displacement of portions of the sidewall panel above the rest of the panel makes possible a simple procedure for molding durable retaining flanges. Retaining flanges that are generally triangularly shaped and located in the corners of the rectangular raised rim have been found to be quite sturdy and long-lasting. Since the retaining flanges are thin and do not project above the raised rim, a continuous, only slightly raised, top surface is provided; and the mailer ordinarily does not become snagged on other pieces of mail.

DESCRIPTION OF THE DRAWINGS

A mailer of this invention is illustrated in the following drawings, wherein.

DESCRIPTION OF THE EMBODIMENTS

Figure 1:
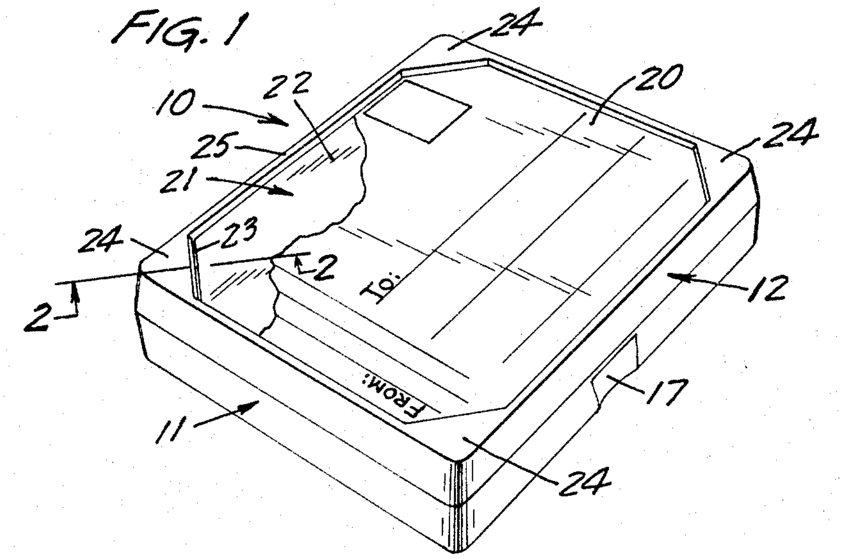
FIGURE 1 is a perspective view of a mailer of this invention with a partially illustrated address card in place.
Figures 2, 3, 4:
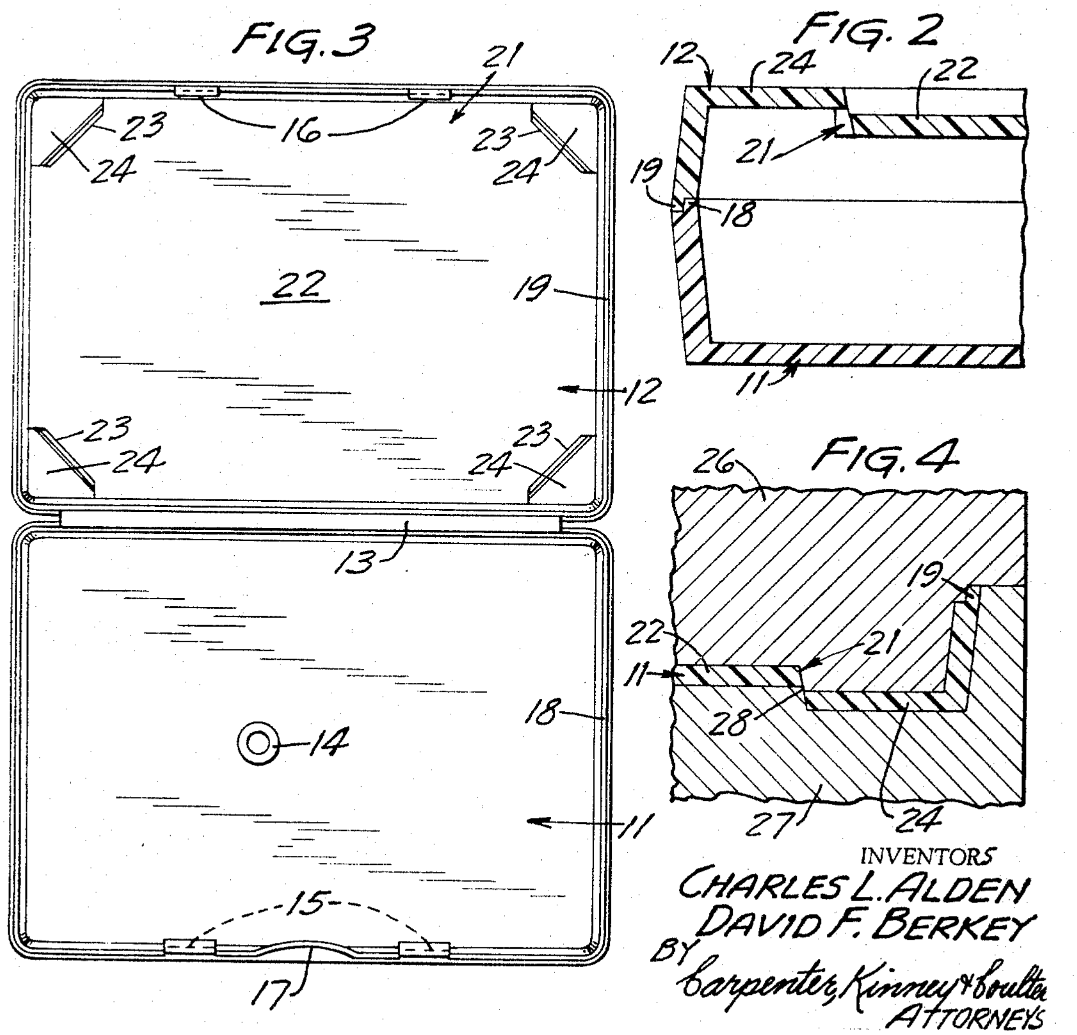
FIGURE 2 is a partial section of a mailer along the lines 2—2 of FIGURE 1.
FIGURE 3 is a plan view showing the inside of the mailer as it comes from the mold.
FIGURE 4 is a section of the portion of the mold in which one part of the portion of the mailer illustrated in FIGURE 2 is formed.

The mailer 10 of this invention shown in FIGURE 1 consists of two parts— a bottom, or container, part 11 and a top, or cover, part 12. The two parts of the mailer illustrated are connected by a hinge 13 shown in FIGURE 3. As further shown in FIGURE 3, a mounting stud 14, which holds in place reels stored in the mailer, projects from the interior surface of the bottom of the container part 11. The latching parts of the mailer are also shown in FIGURE 3 and consist of two recesses 15 in the long free edge wall of the container part 11 of the mailer and cooperating detents 16 on the free edgewall of the cover 12 of the mailer. A gently curved depression 17 is formed in the edge wall of the bottom part of the mailer between the two recesses 15, and the mailer may be unlatched by pressure on the edgewall in this depression. As shown in FIGURE 3 and also in FIGURE 2, the mating edges of the container and cover parts of the mailer are formed as lips 18 and 19 respectively, which have a sliding, telescoping fit together to provide a substantially dust-proof seal.

Provision for an address card is made on the cover part 12 of the mailer illustrated. An address card 20 is partially illustrated in place on the outside surface of the large sidewall 21 of the cover. The large-area sidewall 21 of the cover includes a central, depressed, rectangular panel 22 which is discontinued at the extreme corners of the rectangle along the diagonal lines 23. The sidewall 21 further includes vertically displaced, thin flat retaining flanges 24 which are substantially coextensive with the removed portions of the rectangle of the panel 22. A raised rim 25 strengthens the sidewall and provides a rectangular border around the sidewall 21, inside which the address card is typically safe from snagging. The triangular retaining flanges 24 are attached to the corners of the rim 25 and are located to provide a continuous top surface.

The retaining flanges 24 are spaced about the thickness of a typical address card (generally similar to a recipe or research card) above the outside surface of the panel 22. For best results with a typical address card, it has been found that the spacing should be between about 9 and 20 mils. An address card is difficult or impossible to insert when the spacing is less than about 9 mils, and the card is too loose and the avoidance of dust is less than desired when the spacing is greater than about 20 mils. Of course, the desired spacing depends in part upon the type and thickness of the card or label being inserted.

The mailer is preferably prepared as an integral molding with the two parts of the mailer open 180° and lying along a common plane as shown in FIGURE 3 and connected at their adjacent edges by the hinge 13. Since the mailer is preferably made as an integral molding, with two parts hinged together, special plastics capable of flexing almost indefinitely must be used. As one example, isotactic polypropylene has proved to be useful for this type of application.

FIGURE 4 shows that portion of the die parts that form one retaining flange 24. As will be seen, the mold has two halves 26 and 27 which are opened to remove the molding. It has been found that for best results the mating surfaces of the die halves in the area 28 should be inclined to the direction of their opening and closing movement. Because of this inclination, slight misalignment of the mating surfaces of the two die halves is accommodated. The inclination of the die halves causes the free edge of the retaining flanges 24 to slant upwardly and outwardly, which is advantageous since it further reduces the possibility of the retaining flanges being snagged by other objects.

As will be understood, various embodiments of the invention beside that illustrated are possible. For example, although the illustrated mailer shows triangular retaining flanges in the corners of the sidewall, the retaining flanges need not necessarily be triangular nor need they be located in the corners. For example, retaining flanges formed by displacing other parts of the panel 22 might be used. However, generally-triangular flanges (including, for example, flanges having a curved free edge) located in the corners of the sidewalls have better durability and are quite satisfactory.

As a specific preferred example of the invention, a mailer like that illustrated was molded in a 450-ton injection mold from isotactic polypropylene. The width and length of the mailer were roughly 3¼ and 4½ inches, respectively. The depth of the container part 11 was slightly over 0.4 inch while the depth of the cover part was about 0.3 inch. The hinge 13 was about 10 mils in thickness. The panel 22 was about 60 mils in thickness as were most of the walls of the mailer. The retaining flanges 24 were spaced about 16 mils above the outside surface of the panel 22, and the retaining flanges were about 34 mils thick. To minimize the plastic used and the mailing weight of the mailer, thin walls such as those in this example are desirable. The top surface of the retaining flange was continuous with the top surface of a rectangular raised rim 25 formed around the edge of the panel 22. The edge of the retaining flange slanted upwardly and outwardly about 15° from the vertical.

We claim:

1. A light-weight inexpensive durable substantially dust-proof mailer for magnetic recording tape adapted to externally carry a removable address card and comprising, as a molded plastic article, a shallow rectangular box that includes two mating parts whose mating edges have a telescoping substantially dust-proof fit with each other, and latch means holding the two parts together; the closed box having two parallel large-area sidewalls at least one of which is adapted to retain an address card on its outside surface and includes (1) a basically rectangular panel that is flat uninterrupted and wholly exposed but discontinued at the extreme corners of the base rectangle along generally diagonal lines, (2) generally triagular retaining flanges parallel to and spaced about card-thickness above the panel and substantially coextensive with the discontinued portions of the base rectangle of the panel, and (3) a raised rim bordering at least the discontinued portions of the base rectangle and to which the retaining flanges are joined.

2. The box of claim 1 in which there is a continuous narrow raised rim around the base rectangle of the panel, and the retaining flanges are generally triangular and attached to the rim in the corners of the rectangle.

3. The box of claim 1 in which the edge of the retaining flange adjacent the edge of discontinuation of the panel slants upwardly and outwardly.

4. The box of claim 1 in which the retaining flanges are spaced between about 9 and 20 mils above the panel.

5. A light-weight inexpensive durable substantially dust-proof mailer for magnetic recording tape adapted to externally carry a removable address card and comprising, as an integral molded plastic article, a shallow rectangular box that includes two mating parts that are hinged together and whose mating edges have a telescoping substantially dust-proof fit with each other, and latch means holding the two parts together; the closed box having two parallel large-area sidewalls at least one of which is adapted to retain an address card on its outside surface and includes (1) a basically rectangular panel that is flat uninterrupted and wholly exposed but discontinued at the extreme corners of the base rectangle along generally diagonal lines, (2) generally triangular retaining flanges parallel to and spaced between about 9 and 20 mils above the panel and substantially coextensive with the discontinued portions of the base rectangle of the panel, the free edge of the retaining flanges adjacent the edge of discontinuation being slanted upwardly and outwardly, and (3) a continuous raised rim extending around the base rectangle of the panel and to which the retaining flanges are joined, the top surfaces of the retaining flanges being substantially continuous with the top surface of the raised rim.

6. A light-weight inexpensive durable substantially dust-proof mailer for magnetic recording tape adapted to externally carry a removable address card and comprising, as an integral molded plastic article, a shallow rectangular box that includes two open-top box-like mating parts, each part including one rectangular large-area sidewall surrounded by upstanding edgewall segments that have a telescoping substantially dust-proof fit with the edgewall segments of the other part whereby they form in combination edgewalls of the closed box, the two parts being hinged together at the juncture of the edgewall segments of one edgewall and the two parts being latched in the closed position by latch means located on an edgewall opposite from the hinged edgewall, the latch means including two recesses on the interior of the edgewall segment of one part and two cooperating detents on the edgewall segment of the other part, pressure on the detent-bearing edgewall segment between the two detents disengaging the detents and recesses; and at least one large-area sidewall of the box being adapted to retain an address card on its outside surface and including (1) a central basically rectangular panel that is flat uninterrupted and wholly exposed but discontinued at the extreme corners of the base rectangle along generally diagonal lines, (2) generally triangular retaining flanges parallel to and spaced between about 9 and 20 mils above the panel and substantially coextensive with the discontinued portions of the base rectangle of the panel, the free edge of the retaining flanges adjacent the edge of discontinuation being slanted upward and outwardly, and (3) a continuous narrow raised rim extending around the base rectangle of the panel and to which the retaining flanges are joined, the top surfaces of the retaining flanges being substantially continuous with the top surface of the raised rim.

References Cited

UNITED STATES PATENTS

| | | | |
|---|---|---|---|
| 1,733,629 | 10/1929 | Schleicher | 40—312 |
| 3,297,153 | 1/1967 | Fattori | 206—52 |
| 3,338,464 | 8/1967 | Callihan | 220—85 X |

FOREIGN PATENTS

| | | |
|---|---|---|
| 1,205,748 | 2/1960 | France. |

GEORGE E. LOWRANCE, *Primary Examiner.*

U.S. Cl. X.R.

206—52; 40—312